Oct. 13, 1953 A. F. ALLWEIN Re. 23,723

PRESSURE GAUGE

Original Filed Jan. 4, 1947

INVENTOR.
ALOYSIUS F. ALLWEIN
BY E. Wilford Mason
ATTORNEY.

Reissued Oct. 13, 1953

Re. 23,723

UNITED STATES PATENT OFFICE 23,723

PRESSURE GAUGE

Aloysius F. Allwein, Philadelphia, Pa., assignor, by mesne assignments, to Minneapolis-Honeywell Regulator Company, Minneapolis, Minn., a corporation of Delaware Original No. 2,527,171, dated October 24, 1950, Serial No. 720,201, January 4, 1947. Application for reissue October 19, 1951, Serial No. 252,020

6 Claims. (Cl. 73—393)

Matter enclosed in heavy brackets [ ] appears in the original patent but forms no part of this reissue specification; matter printed in italics indicates the additions made by reissue.

The general object of the present invention is to provide improved means for measuring fluid pressures, and particularly for measuring small changes in a fluid pressure when the pressure is at a fairly high value. A more specific object of the invention is to provide a suppressed range, absolute pressure measuring device characterized by its mechanical simplicity and reliability, its high sensitivity and inherent accuracy, and its freedom from errors due to variations in the pressure and temperature of the ambient atmosphere. A suppressed range pressure gauge is one in which the minimum calibration mark is some value above atmosphere, or in the case of an absolute pressure gauge, some value above absolute zero.

A measuring device constituting a preferred form of embodiment of the invention, is characterized by the novel manner in which separate compensating, measuring and balancing expansible chamber elements are combined in said device. Said elements, which ordinarily are bellows elements, are arranged in end to end relation with the measuring element between the other two, and are mounted in a framework in which the adjacent ends of the measuring and balancing elements and the remote end of the compensating element are held in fixed positions. The adjacent ends of the compensating and measuring elements are mechanically connected to one another and are movably connected to said framework by means including a spring or springs subjecting the measuring element to a pre-loading force of predetermined magnitude. The second end of said balancing elements acts on said connection and augments said pre-loading force by an amount proportional to the fluid pressure in the balancing chamber. Said compensating element contains a gas, ordinarily dry air, under a predetermined pressure substantially lower than atmospheric pressure. Said device also includes means adapted to connect said measuring chamber to a source of variable fluid pressure to be measured, and includes means actuated by the elongation and shortening of the measuring chamber to maintain a fluid pressure in said balancing chamber which automatically varies with the pressure in said measuring chamber as required to maintain the length of the measuring chamber substantially constant.

The means included in said device for controlling the pressure in the balancing chamber may comprise a bleed nozzle and associated pilot or flapper valve, of conventional form for use in air controllers. The pressure in said balancing chamber may be measured by a pressure measuring instrument of any usual or suitable type, to thereby provide a measure of the amount by which the pressure in the measuring chamber exceeds the amount required to balance the forces tending to shorten the measuring chamber. In a practical form and use of said device, the latter is employed as the transmitter of a pneumatic transmission system including a remote receiving element of conventional type. Such a receiving element is in effect, a measuring instrument which frequently includes pressure recording mechanism and control apparatus for producing control effects in selective response to variations in the balancing chamber pressure transmitted to the receiver.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Figure 1:
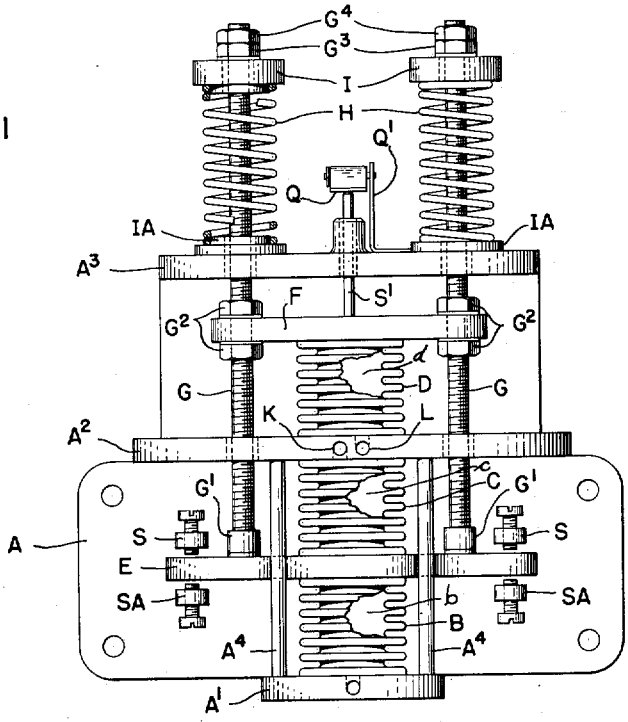
Figure 1 is an elevation of a pressure gauge.

In the accompanying drawings I have illustrated the structural form and mode of operation of a gauge embodying the present invention and adapted for use as a suppressed scale, absolute pressure measuring gauge, operative to measure small changes in relatively high pressures. The gauge structure shown in Figure 1 comprises a rigid framework A including spaced apart portions A', $A^2$ and $A^3$ which may be in the form of parallel plates, and comprises separate compensating, measuring and balancing pressure chamber elements B, C and D respectively. Said elements respectively include chambers b, c and d and are mounted in end to end relation in said framework. Each of said chambers is expansible and collapsible to vary the volume of the corresponding chamber space b, c, or d, and the distance between its ends. In the preferred construction illustrated, the chamber space in each element is surrounded by a corresponding wall portion in the form of a corrugated tube of flexible metal which is brazed or otherwise secured to parts forming the end walls of the element. The measuring element C has one end secured to the framework part $A^2$. The latter is interposed between the adjacent ends of the bellows elements C and D. A movable crosshead E is interposed between the adjacent ends of the bellows elements B and C. The opposite end of the compensating bellows element B engages the abutment formed by the frame part A'.

The compensating element space b contains an elastic fluid, ordinarily dry air, at a predetermined pressure substantially below the pressure of the atmosphere. To prevent the element B from being collapsed by the pressure of the atmosphere, one end of the element is attached to the abutment A' and the other end is attached to the crosshead E. The latter may, in fact, serve as an end wall for the chamber b. The chambers b and c are respectively contracted and elongated by downward movement of the crosshead E, and are respectively elongated and contracted by upward movement of the crosshead E. The crosshead E moves between frame parts $A^4$ extending between the parts A' and $A^2$ and is provided with notches formed in the crosshead E so that it will not touch the frame parts $A^4$. The upper end of the tubular bellows element D is formed by or is in abutting relation with a second floating crosshead F. The chamber space d in the tubular bellows element D is respectively contracted and expanded as the crosshead F moves down and up.

The floating crossheads E and F are rigidly connected and are subjected to an upwardly acting loading force by means comprising two or more spaced threaded rods G each parallel to the axis of the tubular elements B, C and D. Each rod G has its lower end secured to the crosshead E by a suitable anchoring device G' and has nuts $G^2$ threaded on it above and below the crosshead F, to hold the parts E and F in fixed positions relative to each other. In normal operation the last mentioned pressure is substantially in excess of the pressure of the atmosphere. The frame parts $A^2$ and $A^3$ are each formed with passages through which the rods G extend with clearance for free longitudinal movement.

As shown, the movable gauge structure including the crossheads E and F is subjected to an upwardly acting loading force by means comprising helical compression springs H of negligible temperature coefficient, one associated with and surrounding the portion of each rod G extending upward from the plate $A^3$, and each acting between an upper abutment member I and a lower abutment IA, the latter being supported by the frame plate $A^3$. Each upper abutment I is shown as an annulus holding the corresponding spring H in engagement with a nut $G^3$ threaded on the corresponding rod G above the abutment. A second nut $G^4$ is used on each rod G to lock nut $G^3$ in place and thereby retain the adjustment of the springs H.

Figure 2:
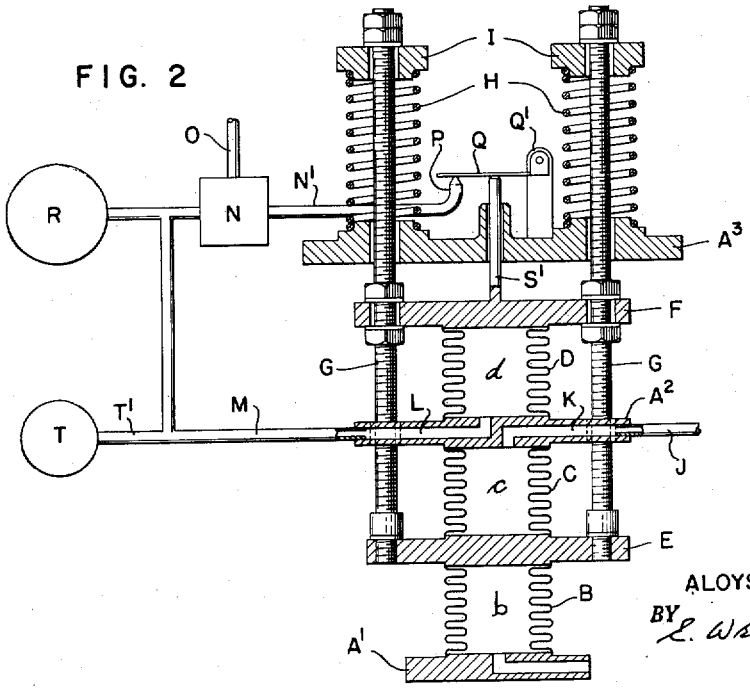
Figure 2 is a diagram illustrating the normal operation and use of the gauge shown in Figure 1.

As is shown in Figure 2, the pressure to be measured is transmitted to the measuring chamber C through a pipe J from a source of pressure to be measured such as an oil refinery tower. The end of the pipe J is secured to the frame part $A^2$ in register with a channel K formed in said part and communicating with the bellows chamber c. A balancing pressure is maintained in the bellows chamber d by means comprising a passage L formed in the frame member $A^2$, and a pipe M having one end secured to the frame part $A^2$ in communication with the passage L, and having its other end connected with the output of a pilot valve N that in turn receives air through a pipe O. The other end of the pipe O is connected to a source, not shown, of air under pressure which preferably is maintained approximately constant at some predetermined value which in practice may well be about 15 to 17 pounds per square inch above the pressure of the atmosphere. Pilot valve N is connected by a pipe N' to the lower end of a bleed nozzle P. The upper end of the bore or longitudinal passage in the nozzle P, is open to the atmosphere except as it may be variably throttled by a valve Q. The latter, as shown, is a so-called flapper valve of customary flat spring form and having one end free and having its other end attached to a stationary support shown in Figure 1 as a bracket Q' attached to and extending upwardly from the frame part $A^3$. An uprising projection S' from the upper side of the crosshead F extends loosely through a passage in the frame part $A^3$ to engage the underside of the valve and move it upward away from the nozzle P on upward movements of the crosshead F. The pressure applied by pilot valve N to chamber d is measured by an instrument R which may be a conventional indicating, recording and/or controlling instrument. The pressure is, of course, proportional to and therefore a measure of the pressure applied to measuring chamber c.

The extent of vertical movement permitted the crosshead E is fixed by stationary upper limit stops S and lower limit stops SA. To stabilize the action of the measuring apparatus and suitably regulate the rate of change in the pressure controlled by the flapper valve Q, a chamber T of suitable capacity may be connected to the pipe M, preferably through a pipe T' or other passage.

The bellows element B is more or less completely exhausted, and provides compensation for changes in the barometric pressure and the temperature of the ambient atmosphere. In a preferred form of the invention a small amount of air is introduced in the bellows B after it has been evacuated in order to compensate for temperature changes in the system. As the temperature at the instrument increases the pressure of the air in chamber b will increase to offset the effects of the temperature increase in the rest of the instrument. The amount of air introduced in the chamber b can be determined empirically. The bellows elements B and C should be of the same diameter, but the diameter of the bellows D may vary with the conditions of use. In particular, the diameter of the bellows D may be dependent on the relation of the scale range of the instrument R to the maximum and minimum pressures in the bellows chamber c through the range of the instrument. Thus, if instrument R has a scale range of 30 p. s. i. with a maximum pressure of 130 p. s. i. and a minimum pressure of 100 p. s. i a pressure of 100 p s. i. is required in chamber c before a pressure starts to build up in chamber d due to downward movement of cross bars E and F. If the maximum pressure which can be maintained in the chamber d is 15 pounds, then the cross sectional area of the chamber d should be not less than double the cross sectional area of the chamber c.

Until the pressure in the chamber c, which is to be measured, approaches the lower limit of the instrument range, the flapper valve Q is held in its wide open position and the pressure in the bellows chamber d is equal to the pressure of the atmosphere and produces no measuring effect. The minimum downwardly acting force which the fluid pressure in the chamber c must exert against the crosshead E to move the latter out of engagement with the upper limit stops S, is equal to the sum of the force due to the fluid pressure in the chamber b acting upwardly against the crosshead E and the upwardly acting force impressed on the crosshead E by the lifting springs H.

In the present embodiment of the invention absolute pressure is measured since the pressure in bellows C is opposed to the pressure in bellows B, which is substantially zero. This is in effect a differential pressure gauge. By connecting the space b to any other source of pressure the instrument would measure the differential pressure between that source and the source connected to pipe J. An ordinary pressure gauge would be obtained if bellows B were omitted entirely. In such a case the instrument would operate in the manner in which it now operates except that bellows C would not be opposed by any force other than that of springs H.

As will be readily apparent to those skilled in the art, the pressure measuring apparatus shown in Figure 1 is characterized by its mechanical simplicity and sturdiness and by its operative reliability and accuracy, and by the complete absence of friction in the moving parts. It is well adapted, for example, for use in association with a commercially available recorder controller type of receiver to maintain an oil refinery pressure of 100 p. s. i. or so, practically constant during prolonged oil refinery operation periods. While the device shown in Figure 1 is novel as an entity, it is composed of parts of commercially available character and demonstrated reliability. The bellows elements B, C and D may be identical in general construction and form with bellows elements in extensive use in air controllers and other fluid pressure apparatus. The flapper valve Q and vent pipe arrangement used may be of the type now in extensive use in air controllers. Although the pressure fluids in each of the elements B and D should be an elastic fluid such as air, the pressure fluid in the bellows C may be either a liquid or a gas.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure with Letters Patent is:

1. A suppressed scale, absolute pressure measuring device comprising a rigid framework and separate compensating measuring and balancing chamber elements mounted in end to end relation in said framework with the measuring element between the other two elements and with the adjacent ends of said measuring and balancing elements and the remote end of said compensating element in fixed positions in said framework, each element being expansible and collapsible to respectively elongate and shorten the element, a movable crosshead interposed between the adjacent ends of said compensating and measuring elements and attached to said adjacent end of said compensating element, a rigid connection between said crosshead and the end of said balancing element remote from said measuring element whereby the elongation or shortening of said measuring bellows is attended by a shortening or elongation respectively of said balancing element, resilient means connecting said rigid connection to said framework and tending by its resiliency to shorten said measuring element and elongate said balancing element, said compensating chamber element being responsive to the ambient atmospheric pressure and temperature, means connecting said measuring element to a source of fluid under pressure to be measured, means including a bleed nozzle and a valve connected to said crosshead and adjusted by movements of the latter for increasing and decreasing the pressure in said balancing element as required to maintain said crosshead in an approximately constant position, and exhibiting means responsive to and exhibiting the pressure in said balancing chamber.

2. A device as specified in claim 1, in which the connection between said crosshead and balancing element end comprises a rigid tension element alongside said second and third elements and in which said resilient means comprises spring means connecting the end of said tension element remote from said crosshead to said framework and in which the free end of said balancing element is connected to said tension element for movement with the latter and said crosshead.

3. A device as specified in claim 1, in which the connection between said crosshead and balancing element end comprises rods alongside said second and third elements and each connected at one end to said crosshead, and in which said resilient means comprises a separate compression means acting between each rod and said framework in the direction to subject the rod to tension.

4. A device as specified in claim 1, in which the connection between said crosshead and balancing element end comprises threaded rods alongside said second and third elements and each connected at one end to said crosshead and provided at opposite ends with a spring abutment including a nut threaded on the rod and rotatable to adjust said abutment longitudinally of the rod and in which said resilient means comprises a separate helical spring surrounding a portion of each rod between said abutment and crosshead and acting as a compression spring between said abutment and a portion of said frame between said abutment and said crosshead.

5. A device as specified in claim 1, in which the connection between said crosshead and balancing element end comprises threaded rods alongside said second and third elements and each connected at one end to said crosshead and provided at opposite ends with a spring abutment including a nut threaded on the rod, and in which said resilient means comprises a separate helical spring surrounding a portion of each rod between said abutment and crosshead and acting as a compression spring between said abutment and a portion of said frame between said abutment and said crosshead, and in which the connection between said crosshead and the remote end of said balancing element comprises nuts on said rods adjacent and operatively engaged by said remote end.

*6. In a device of the class described, means for developing forces corresponding to a changing variable to be measured, adjustable mechanism for applying a selected force opposing said first-mentioned forces, means for supplying a pneumatically-controlled force opposing said first-mentioned forces, mechanism responsive to am-*

*bient temperatures serving also to apply forces corresponding to said temperatures in opposition to said first-mentioned forces to compensate for ambient temperature variations, a manually adjustable element for adjusting said adjustable mechanism, means for detecting any unbalance between the first-mentioned forces and the remaining forces, mechanism responsive to any unbalance detected by said detecting means for controlling the magnitude of the pneumatically-controlled force proportionally to the detected unbalance, and an instrument actuated in accordance with the pneumatically-controlled forces.*

ALOYSIUS F. ALLWEIN.

References Cited in the file of this patent or the original patent

UNITED STATES PATENTS

| Number | Name | Date |
|---|---|---|
| 2,276,505 | Moore | Mar. 11, 1942 |
| 2,527,171 | Allwein | Jan. 4, 1947 |

FOREIGN PATENTS

| Number | Country | Date |
|---|---|---|
| 507,252 | Great Britain | June 13, 1932 |
| 562,645 | Great Britain | July 11, 1944 |

OTHER REFERENCES

"Operating Instructions and Parts List for Taylor Pneumatic Transmitter (Series 206 RA Absolute Pressure Type) (Series 206 RF Differential Pressure Type)," Taylor Instrument Companies, Rochester, N. Y., printed October 1944. (Eighteen pages including title page.)

Page 601 of September 1945 issue of Instruments.